United States Patent
Lally

(10) Patent No.: US 8,272,803 B2
(45) Date of Patent: Sep. 25, 2012

(54) CONVEYOR SHAFT ASSEMBLY WITH SPRING CLIP

(75) Inventor: Brett A. Lally, Metairie, LA (US)

(73) Assignee: Laitram, L.L.C., Harahan, LA (US)

( * ) Notice: Subject to any disclaimer, the term of this patent is extended or adjusted under 35 U.S.C. 154(b) by 204 days.

(21) Appl. No.: 12/691,009

(22) Filed: Jan. 21, 2010

(65) Prior Publication Data
US 2011/0176858 A1 Jul. 21, 2011

(51) Int. Cl.
*F16D 1/116* (2006.01)

(52) U.S. Cl. .......................... 403/316; 411/523

(58) Field of Classification Search ............. 403/315, 403/316, 317, 319, 11, 13; 24/129 B, 545, 24/910; 248/541; 193/35 C
See application file for complete search history.

(56) References Cited

U.S. PATENT DOCUMENTS

| 913,876 A | 3/1909 | Cohen |
| 1,150,073 A | 8/1915 | Spengler |
| 2,052,900 A | 9/1936 | Searles et al. |
| 2,295,685 A * | 9/1942 | Place .................... 411/524 |
| 2,526,285 A * | 10/1950 | Schuyler ................ 224/551 |
| 2,804,732 A | 9/1957 | Brockley |
| 2,851,823 A * | 9/1958 | Peterson ................. 47/47 |
| 2,961,479 A * | 11/1960 | Bertling ................. 174/43 |
| 2,968,850 A * | 1/1961 | Tinnerman ............... 403/397 |
| 3,554,555 A * | 1/1971 | Macri .................... 473/264 |
| 3,557,477 A * | 1/1971 | Trent .................... 40/413 |
| 3,648,334 A | 3/1972 | Swalm |
| RE27,591 E | 3/1973 | Munse |
| 3,724,285 A | 4/1973 | Lapeyre |
| 4,332,060 A | 6/1982 | Sato |
| 5,544,740 A | 8/1996 | Kissee |
| 6,785,918 B2 | 9/2004 | Romo |
| 7,093,385 B2 * | 8/2006 | Engler .................... 40/591 |
| 7,178,776 B2 * | 2/2007 | Buck et al. ............... 248/300 |
| 8,006,434 B2 * | 8/2011 | Allsop et al. ............. 47/47 |

FOREIGN PATENT DOCUMENTS

| DE | 2342703 A1 | 3/1974 |
| EP | 1288509 A1 | 3/2003 |
| FR | 902367 A | 8/1945 |
| FR | 2299545 A1 | 8/1976 |
| WO | 02084161 A1 | 10/2002 |

OTHER PUBLICATIONS

PCT/US11/20680, International Search Report and Written Opinion of the International Searching Authority, mailed Apr. 26, 2011, European Patent Office, Rijswijk, NL.
American Standard, "Lavatory Drains," pp. G-8 and G-9 of product catalog, American Standard, Inc. 1996.

* cited by examiner

*Primary Examiner* — Daniel P. Stodola
*Assistant Examiner* — Daniel Wiley
(74) *Attorney, Agent, or Firm* — James T. Cronvich

(57) ABSTRACT

A shaft assembly using spring clips to confine components mounted on the shaft in selected positions. The shaft assembly includes a shaft with components mounted along its length. Each component is confined by a pair of flanking spring clips. Each spring clip has a pair of confronting side panels resiliently coupled together. Holes through the side panels receive the shaft. The side panels are biased to converge toward each other so that a laterally applied force from a confined component acts in the direction of the bias to prevent the clip locked on the shaft from unlocking.

11 Claims, 1 Drawing Sheet

CONVEYOR SHAFT ASSEMBLY WITH SPRING CLIP

BACKGROUND

The invention relates generally to power-driven conveyors and more particularly to conveyor shafts having mounted components, such as rollers, confined to a portion of the shaft by spring clips.

Endless conveyor belts travel in a loop along an upper carryway and a lower returnway. Supports are positioned along the returnway to support the belt and minimize catenary sag. One common returnway support includes a set of doughnut-shaped rollers mounted for rotation on a round shaft, gravity roller, or other tubular structure. Because the rollers are free to rotate, they produce lower friction in contact with the belt than do static supports, such as shoes. But one problem associated with the returnway rollers is their tendency over time to migrate axially along the shaft under the influence of forces from the belt. Migration of the doughnut rollers can cause belt misalignment and noise.

Various schemes have been used to prevent doughnut rollers from migrating along the shaft. Shaft clamps and hose clamps are effective, but are expensive and labor-intensive to install. Duct tape on the shaft flanking the doughnut rollers can be effective, but is not aesthetically pleasing. Spring-tension clips, like those used to connect the clevis at the bottom of the lift rod to the pivot rod of the stopper in a bathroom sink, have also been used. But lateral pressure by a doughnut roller against such a spring-tension clip with its outwardly bent arms tends to release the bite of the clip on the shaft and allow the roller to push the clip along the shaft.

Thus, there is a need to prevent shaft-mounted components, such as doughnut rollers, from migrating along a shaft.

SUMMARY

This need or other needs are satisfied by a shaft assembly embodying features of the invention. The assembly includes a shaft-mounted component having a bore received by a shaft. A pair of spring clips mounted on the shaft on opposite sides of the component confine the component to a region of the shaft between the spring clips. Each of the spring clips includes a pair of resiliently coupled confronting side panels. Holes through the side panels receive the shaft. The side panels are biased to converge toward each other out to distal ends in a relaxed spring state to lock in place on the shaft. The side panels may be unlocked to slide along the shaft by spreading the side panels apart.

In another aspect of the invention, a spring clip that may be slidably mounted to a shaft comprises a pair of confronting side panels. Holes in the side panels receive a shaft. The side panels are resiliently coupled to each other at first ends and biased to converge toward each other out to opposite second ends in a relaxed spring state. The resilient coupling allows the two side panels to be manually flexed apart so that the holes are aligned perpendicular to the shaft to allow the spring clip to be slid along the shaft.

In yet another aspect, a spring clip slidably mountable on a shaft comprises a strip of resilient material bent along two bend lines to form a base between the bend lines and two confronting side panels. The two side panels are biased to converge toward each other from the two bend lines out to distal ends. Holes through the side panels are sized to receive a shaft along which the spring clip can be slid.

BRIEF DESCRIPTION OF THE DRAWINGS

These features and aspects of the invention, as well as its advantages, are better understood by referring to the following description, appended claims, and accompanying drawings, in which:

DETAILED DESCRIPTION

Figure 1:
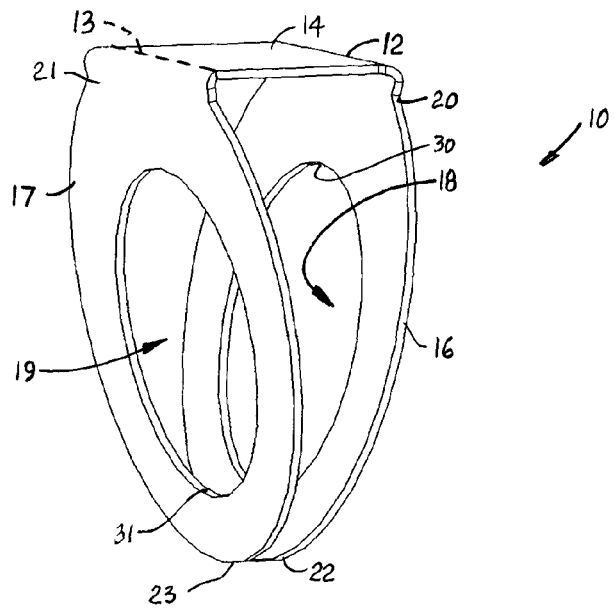
FIG. 1 is an axonometric view of a spring clip embodying features of the invention for confining components to a shaft.

A spring clip embodying features of the invention is shown in FIG. 1. The spring clip 10 shown is formed of a thin strip of resilient material, such as spring steel, bent inward along two bend lines 12, 13 across a web forming a base 14 for a pair of side panels 16, 17. The side panels shown are generally annular in shape. Central holes 18, 19 through the side panels are sized and shaped to receive a shaft or other tubular structure having a circular cross section. (The term "shaft" is used in this specification broadly to encompass any tubular structure, including conveyor shafts, rods, and roller-conveyor rollers.) The side panels, which are resiliently coupled to each other through the base, are biased toward each other in the relaxed state of the spring clip shown in FIG. 1. The resilient coupling allows the side panels to be flexed against the inherent spring bias into an alignment that makes the clip easy to slide along the shaft. In the spring clip of FIG. 1, the web and each of the side walls are bendable. The two confronting side panels converge from their proximal ends 20, 21 at the bend lines 12, 13 out to their distal ends 22, 23. In the relaxed state of the spring clip, the distance $d_D$ between the distal ends is less than the distance $d_P$ between the proximal ends, as better shown in FIG. 3. When viewed on edge, the relaxed spring clip resembles a triangle open at the angle opposite the base 14. The two converging side panels 16, 17 form acute angles α, α' with the base. In the version shown, the angles are equal (α=α') and the side panels are the same size and shape, so that the relaxed spring clip defines on edge an open isosceles triangle.

Figure 2:
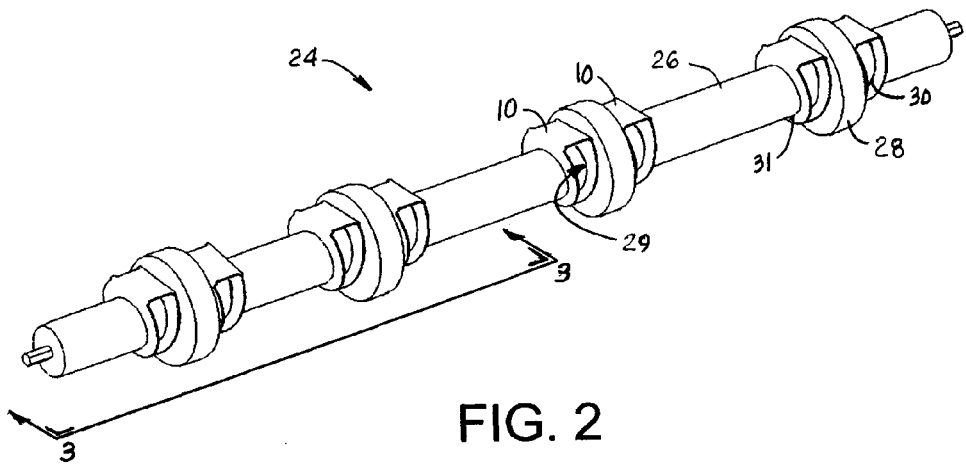
FIG. 2 is an isometric view of a shaft assembly embodying features of the invention including the spring clip of FIG. 1.
Figure 3:
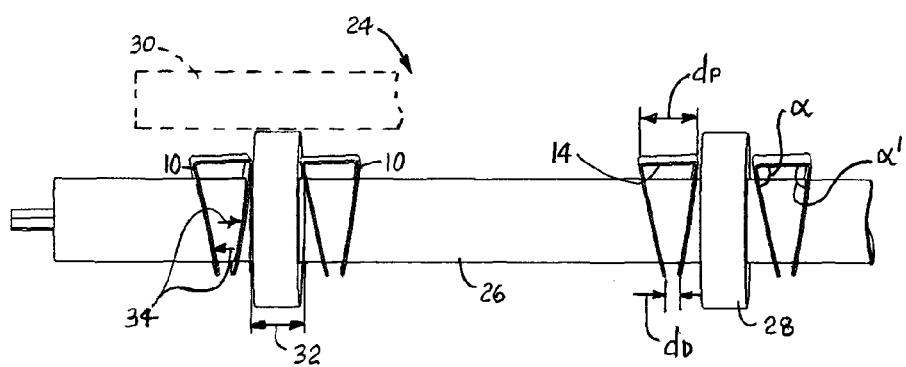
FIG. 3 is an enlarged view of a portion of the shaft assembly of FIG. 2 viewed along lines 3-3.

The use of the spring clips to confine components on a shaft is shown in the shaft assembly of FIGS. 2 and 3. The shaft assembly 24 includes a shaft 26, which, in this example, is a roller-conveyor roller. Mounted on the shaft at generally uniform positions are a plurality of components 28—in this example, four doughnut rollers with circular bores 29 to receive the shaft. Each of the rollers may be used, for example, to support a conveyor belt 30 in a returnway. Each of the components is flanked by a pair of spring clips 10. When the spring clips are mounted on the shaft 26, the side panels 16, 17 are forced away from each other enough for the holes 18, 19 which have a slightly larger diameter than the shaft, to align their axes more closely to accommodate the shaft. Tension in the spring clips urging the side panels toward each other causes the edges 30, 31 of the clips bounding the holes to bite into the periphery of the shaft and lock the clips in place. The spring clips in FIGS. 2 and 3 are shown in the locked position confining the components 28 to a region 32 of the shaft between the clips. The proximal ends 20, 21 of the side panels 16, 17 facing the components are closer to the components than the distal ends 22, 23 when the spring clips are locked on the shaft. Any lateral force directed along the axes of the shaft by the component against a facing side panel acts in the direction of the spring bias to lock the spring clip in place even more tightly. Thus, the inward bend of the spring clip prevents lateral pressure from unlocking it.

The components 28 may be axially repositioned on the shaft 26 by sliding the spring clips 10 along the shaft. The spring clips are unlocked by the application of forces 34 directed outwardly to spread the side panels 16, 17 apart farther to better align the holes 18, 19. The forces may be applied manually with or without a tool. With the axes of the holes aligned parallel to the shaft, i.e., with the holes lying generally in parallel planes aligned perpendicular to the shaft, the clips 10 may be easily slid along the shaft and the component repositioned. The spring clips are installed on and removed from the shaft in the same way—by first spreading the side panels apart.

The features of the invention have been described with reference to one example. Because these features may be realized in other structures, the scope of the invention is meant to be defined by the claims and not limited to the details of the example described in detail.

What is claimed is:

1. A shaft assembly comprising:
a shaft;
a roller having a bore receiving the shaft;
a pair of spring clips mounted on the shaft on opposite sides of the roller to confine the roller to a region of the shaft between the spring clips;
wherein each of the spring clips includes a pair of resiliently coupled confronting side panels having holes therethrough for receiving the shaft, the side panels being biased to converge toward each other out to distal ends in a relaxed spring state to lock in place on the shaft; and
wherein the side panels are unlocked to slide along the shaft by spreading the side panels apart.

2. A shaft assembly as in claim 1 wherein the shaft, the bore, and the holes have circular cross sections.

3. A shaft assembly as in claim 1 further comprising a plurality of rollers mounted on the shaft, each flanked by a pair of the spring clips.

4. A shaft assembly as in claim 1 wherein each of the spring clips comprises a strip of resilient material bent along two bend lines to form a base between the two bend lines with the pair of confronting side panels biased to converge toward each other from proximal ends at the two bend lines out to the distal ends.

5. A shaft assembly as in claim 4 wherein the distance between the proximal ends of the two side panels is greater than the distance between the distal ends of the two side panels when the spring clip is locked on the shaft.

6. A shaft assembly as in claim 4 wherein the proximal ends of the side panels facing the roller are closer to the roller than the distal ends of the side panels.

7. A shaft assembly as in claim 1 wherein the side panels are annular in shape.

8. A shaft assembly as in claim 1 wherein the side panels are the same size and shape.

9. A shaft assembly as in claim 1 wherein the spring clips each comprise a web of resilient material joining first proximal ends of the side panels across a base.

10. A shaft assembly as in claim 9 wherein the side panels form acute angles with the base in a relaxed state of the spring clip.

11. A shaft assembly as in claim 10 wherein the acute angles are equal.

\* \* \* \* \*